United States Patent
Swaminathan et al.

(10) Patent No.: US 8,725,788 B2
(45) Date of Patent: May 13, 2014

(54) SYSTEM AND METHOD FOR DECRYPTION OF CONTENT INCLUDING PARTIAL-BLOCK DISCARD

(75) Inventors: Viswanathan Swaminathan, Saratoga, CA (US); Saayan Mitra, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 145 days.

(21) Appl. No.: 13/118,151

(22) Filed: May 27, 2011

(65) Prior Publication Data

US 2013/0129085 A1 May 23, 2013

(51) Int. Cl.
G06F 15/16 (2006.01)
(52) U.S. Cl.
USPC .......................................... 709/200; 709/228
(58) Field of Classification Search
USPC .......................................................... 709/228
See application file for complete search history.

(56) References Cited

U.S. PATENT DOCUMENTS

| | | | | |
|---|---|---|---|---|
| 2007/0198858 A1* | 8/2007 | Kim et al. | | 713/193 |
| 2008/0101414 A1* | 5/2008 | Zhang | | 370/476 |
| 2010/0172497 A1* | 7/2010 | Candelore et al. | | 380/200 |

* cited by examiner

*Primary Examiner* — John B. Walsh
(74) *Attorney, Agent, or Firm* — Wolfe-SBMC

(57) ABSTRACT

Embodiments may include receiving a protected version of content that includes multiple encryption chains each including encrypted blocks of content. The protected version of content may include one or more initialization vectors for decrypting the encrypted blocks of content and discard information that specifies non-content portions of one or more data blocks to be discarded after decryption. Embodiments may also include performing chained decryption on the multiple encryption chains using the initialization vectors specified by the decryption information. The chained decryption may result in a sequence of decrypted data blocks. Embodiments may also include, based on the discard information, locating and removing the non-content portions of one or more data blocks in the sequence of decrypted data blocks. Embodiments may also include generating the protected version of content. Embodiments may also include performing any of the aforesaid techniques on one or more computers.

24 Claims, 11 Drawing Sheets

SYSTEM AND METHOD FOR DECRYPTION OF CONTENT INCLUDING PARTIAL-BLOCK DISCARD

BACKGROUND

1. Field of the Invention

The present invention is directed to computer systems. More particularly, it is directed to the protection of electronic content within a computing environment.

2. Description of the Related Art

To combat unauthorized consumption of content, some content owners have adopted an approach to protecting their content known as digital rights management ("DRM"), which may include various techniques for limiting access of electronic content to authorized individuals and/or enforcing other restrictions on the use of such content. Typically, clear content that is to be protected by DRM is encoded and packaged into an encrypted form. At packaging time, the packaging unit responsible for packaging content may utilize various types of encryption algorithms for encrypting content. In some cases, these encryption algorithms may encrypt content based on a cryptographic key, which may be selected or generated in a random fashion. At some point, the encrypted content may be provided to an electronic device associated with a content consumer. For instance, the consumer may pay a one-time fee or a recurring subscription fee to access the content electronically. To view the content in unencrypted form on the consumer's electronic device, the device may be required to obtain a respective content license that includes the correct cryptographic key for decrypting the content or means to securely acquire the cryptographic key.

In some cases, the decryption of content by client devices may not be an inconsequential undertaking. For instance, some lightweight devices (e.g., some handheld devices and mobile phones) may expend a significant quantity of available computing resources when decrypting and consuming content.

SUMMARY

Various embodiments of a system and method for decryption of content including partial-block discard are described. Embodiments may include receiving content to be protected and packetizing the content into multiple packets that each include content information and non-content information. Embodiments may also include generating a protected version of the content by performing chained encryption on the multiple packets. The chained encryption may result in a sequence of encrypted blocks, at least some of which include both content information and non-content information. One non-limiting example of such the protected version of the content may include encrypted frames of video and/or audio that are encrypted according to a chained encryption standard. In various cases, to prevent a break in at least one encryption chain of the sequence of encrypted blocks within the protected version of the content, embodiments include inserting discard information within the protected version of the content. The discard information may specify the location of non-content information to be discarded from one or more of the encrypted blocks after chained decryption. For instance, when a client receives such content and after the client decrypts the content, the client may utilize the discard information to locate and remove the non-content information marked for discard.

Embodiments may also include receiving a protected version of content that includes multiple encryption chains each including encrypted blocks of content. The protected version of content may include initialization vectors for decrypting the encrypted blocks of content and discard information that specifies non-content portions of one or more data blocks to be discarded after decryption. Embodiments may also include performing chained decryption on the multiple encryption chains using the initialization vectors specified by the decryption information; the chained decryption may result in a sequence of decrypted data blocks (e.g., decrypted video and/or audio). Embodiments may also include, based on the discard information, locating and removing the non-content portions of one or more data blocks in the sequence of decrypted data blocks. For example, a data block may include media content and non-media content; the non-media content portion may be removed according to the discard information.

Figure 1:
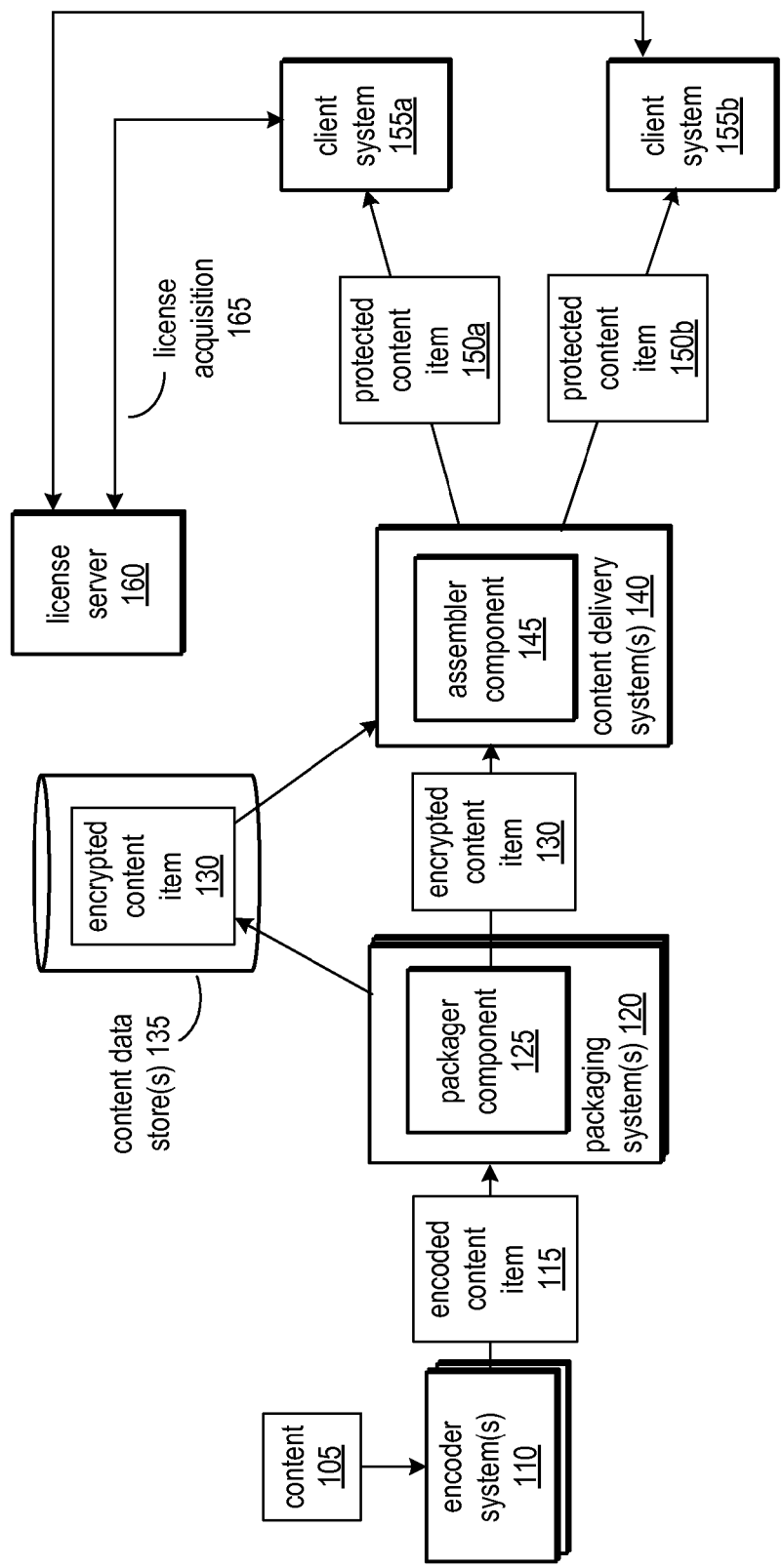
FIG. 1 illustrates block diagram of an example system configuration in which decryption of content including disconnected encryption chains may be implemented, according to some embodiments.

While the system and method for decryption of content including partial-block discard is described herein by way of example for several embodiments and illustrative drawings, those skilled in the art will recognize that the system and method for decryption of content including partial-block discard is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for decryption of content including partial-block discard as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for decryption of content including partial-block discard are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments include various encryption and/or decryption keys, any of which may be generated via a key derivation function (KDF). Key derivation functions may include the completion of one or more iterations or instances of cryptographic operations in order to generate an encryption or decryption key. Examples of key derivation function may include but are not limited to any key derivation functions specified by Public Key Cryptography Standards (PKCS) (e.g., PKCS-5 or PKCS-12) or Adobe® Password Security. In various embodiments, KDFs may be utilized by any of the various components described herein to generate encryption keys for symmetric encryption.

Various portions of this detailed description may refer to "client(s)" and "server(s)" or similar terminology. For instance, various embodiments may include (among other elements) a client system or client device (or simply a "client"). It should be understood that the terms "client" and "server" do not impose any limitation on the operation, configuration, or implementation of such elements. It should be understood that these terms are used only as convenient nomenclature. Indeed, various embodiments are need not be limited by the principles of a conventional client-server architecture.

In various instances, this detailed description may refer to content items (which may also be referred to as "content data," "content information" or simply "data" or "information"). In some instances, content items may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 13:
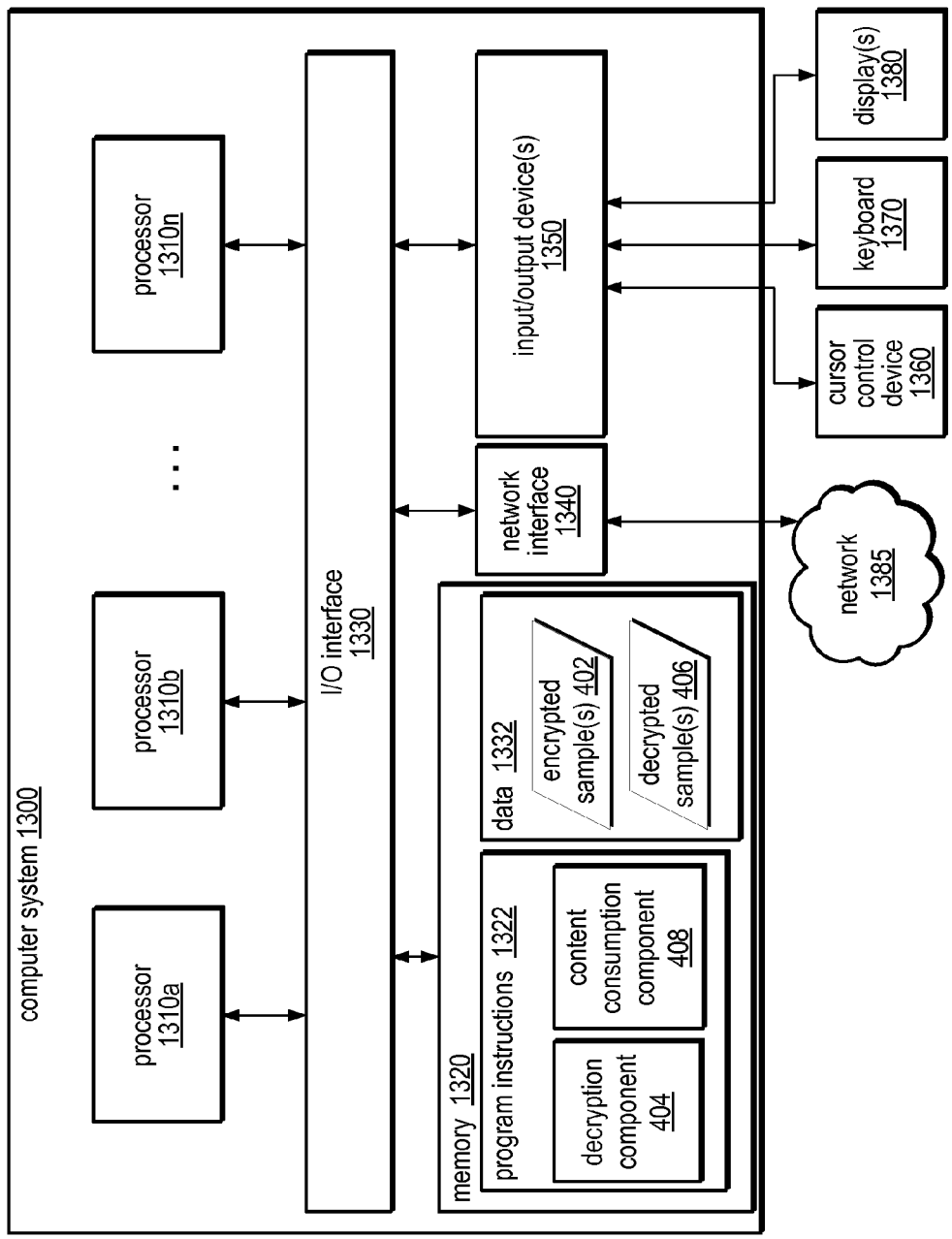
FIG. 13 illustrates an example computer system suitable for implementing various components of the system and method for decryption of content including partial-block discard, according to various embodiments.

In various instances, this detailed description may refer to a devices configured to perform content consumption, such as client system 140. In various embodiments, such a device may include but is not limited to a computing system (e.g., a desktop or laptop computer), a set-top television box, a digital audio or multimedia player (e.g., an MP3 player), a personal digital assistant (PDA), a mobile phone, a smartphone, a touchscreen phone, an e-book reader, a digital photo frame, or any other device or system configured to access, view, read, write, and/or manipulate any of the content data described herein. Any of such devices may be implemented via a computer system similar to that described with respect to FIG. 13.

Note that in various instances the description presented herein may refer to a given entity performing some action. It should be understood that this language may in some cases mean that a system (e.g., a computer) owned and/or controlled by the given entity is actually performing the action.

Note that in various instances the description presented herein may refer to a public key being associated with a private key or a public key corresponding to private key. It should be understood that such statements may mean that such a public key forms a public key-private key pair with such a private key. Additionally, in some cases, a public key-private key pair may be referred to as simply a "key pair." Note that in various embodiments, public key-private key pairs may be generated via one or more key derivation functions, such as those described above.

FIG. 1 illustrates a flow diagram of a framework in which various embodiments of the system and method for decryption of content including partial-block discard. In the illustrated embodiment, content 105 may represent a media object, which may include any type of media program that may be represented and/or stored as electronic content (e.g., electronic representations of audio, video, images, presentations or some combination thereof). In various embodiments, a media program may include prerecorded content including but not limited to movies or motion pictures, television programs, video clips or snippets, audio productions, as well as live content including but not limited to content conveying real-time or near-real time events (e.g., a live sporting event or competition). One or more encoder systems 110 may be configured to input content 105 and generate an encoded content item 115 corresponding to content 105. In various embodiments, encoder systems may encode or compress content 105 according to one or more codecs or standards for video compression in order to generate encoded content item 115. One non-limiting example of such a standard includes the H.264 standard.

For clarity of illustration, only a single encoded content item 115 is presented in the illustrated embodiment. However, it should be understood that the illustrated system may create multiple encoded content items. For instance, in various embodiments, different encoded content items may represent different temporal segments of the same media object. For example, if the media object were a movie, each encoded content item may represent a different temporal segment of that movie. Each temporal segment may be specified by a different time period of the movie, a different set of frames within the movie or a different scene within the movie, for example.

In the illustrated embodiment, encoded content item 115 may be processed by a packager component 125. In various embodiments the packager component may be implemented on a packaging system 120, which may in some cases be implemented by a computer system, such as that illustrated in FIG. 13 described below. As illustrated, the packager component 125 may package and encrypt encoded content item 125 to generate a corresponding encrypted content item 130. Additional details of the manner in which encrypted content items 130 are generated are described below with respect to FIGS. 2-3. Generally, to support different client systems, platforms or configurations, packager component 125 may be configured to generate a single encrypted content item 130 that may be assembled into multiple different content formats for different client systems without encrypting the content multiple times. As described in more detail below, the manner in which packager component 125 generates the encrypted content item may save time and/or processing resources because embodiments may require only one instance of encryption to support different content formats for different clients. In another example, the manner in which packager component 125 generates the encrypted content item may save storage resources (or reduce utilization of existing storage resources) by enabling multiple client content formats to be supported by the same encrypted content stored in a data store.

In various embodiments, the encrypted content item 130 may be provided directly to content delivery system(s) 140 and/or stored in a content data store(s) 135. In one non-limiting example, real-time or near real-time content (e.g., content for a live sporting event) may be provided to content delivery system(s) 140 whereas other content may be stored in content data store(s) 135 and retrieved by content delivery system(s) 140 at a later time. Once assembler component 145 receives the encrypted content item 130, the assembler component may assemble the encrypted content item into any of a number of formats supported by client systems 155*a-b*; this process may be performed without re-encrypting the content. In other words, the manner in which the packaging and assembling process is performed may preserve bit compatibility among the encrypted content of different content formats.

In the illustrated embodiment, only two client systems 155*a-b* are presented for clarity of illustration. It should be understood that in various embodiments, any number of client systems or devices may be supported. As illustrated, each client system 155*a-b* may be provided with a different version of the encrypted content item. In the illustrated embodiment, protected content item 150*a* and protected content item 150*b* may adhere to different file formats, standards or specifications. Differences between the two versions of content items are described in more detail below.

To obtain the decryption key for decrypting a protected content item, each client system may perform a license acquisition 165 with license server 160. For instance, each encrypted content item may have a metadata portion that includes an encrypted version of the content encryption key used to encrypt that content item. This encrypted content encryption key may have been encrypted with the public key of license server 160. At 165, the client system may submit this encrypted content encryption key to license server 160 as part of a license request. After the license server 160 positively authenticates the client system (if required), the license server may use its own private key to decrypt the encrypted content encryption key to determine the unencrypted version of the content encryption key. The license server may then re-encrypt the content encryption key with the client system's public key (or a public key of the application that is to consume the content) such that only that client system can properly decrypt that content encryption key. The result of this key re-encryption is provided within a response sent from the license server 160 to the client system. The client system may decrypt the encrypted content decryption key from that response with the corresponding private key. This content encryption key may be used to decrypt the protected content item received by that client system. In various embodiments, the client system may use this same content encryption key to decrypt subsequent ones of encrypted content items 130. Of course, in various embodiments, decryption keys may change over time and license acquisition can be performed again when this happens. In other embodiments, other techniques for protecting the content encryption may be utilized. For instance, in some embodiments, when the client receives the content license, the content license may already include the content encryption key protected (e.g., encrypted) for that particular client. In other embodiments, the client systems may utilize other techniques for license acquisition or content decryption key acquisition, whether presently known or developed in the future. Note that the aforesaid techniques are non-limiting. In general, any technique by which the license server provides the license (including a decryption key) back based on the content identifier may be utilized. Each client system may consume (e.g., play) the decrypted content, such as by playing the content within a media player application. For instance, decrypted video and/or audio may be played through a media player application and human-perceptible visual and/or audio representations of the audio/video may be generated on an electronic display and/or audio transducer (e.g., a speaker) coupled to the client system.

Figure 2:
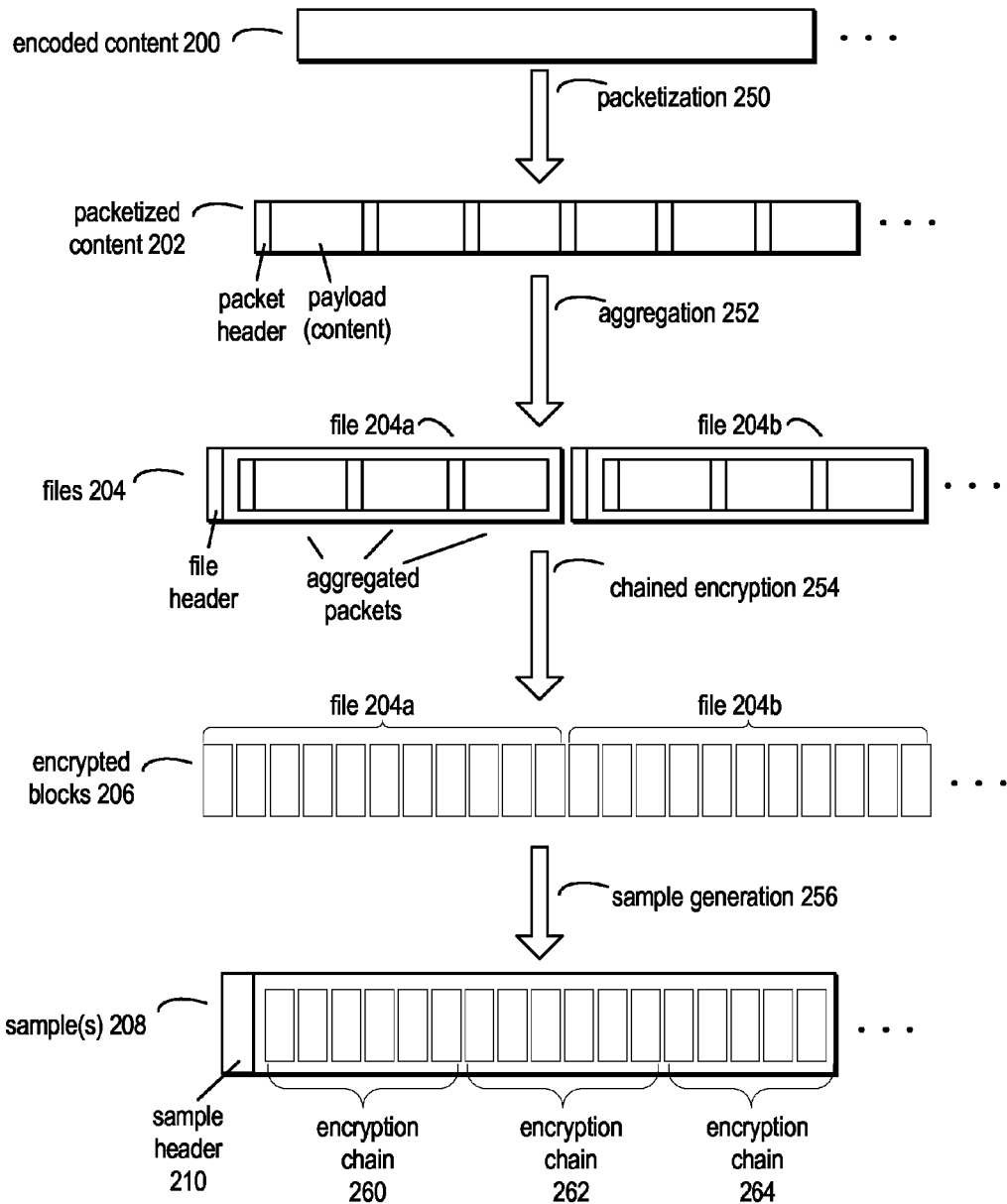
FIG. 2 illustrates an example flow diagram for the creation of different protected content formats without redundant encryption of content, according to some embodiments.

FIG. 2 illustrates an example process for generating multiple protected versions of content without redundant encryption and storage of the content. In various embodiments, the illustrated process may be performed by packager component 125 and/or assembler component 145 described above. In various embodiments, the illustrated process may be implemented on a computer system, such as computer 1300 of FIG. 13. As illustrated at packetization 250, encoded content 200, such as encoded content item 115 of FIG. 1, may be packetized into packetized content 202. In some embodiments, packetizing may include parsing the encoded content into packets, each of which may include packet header information and a packet payload that includes content. In one non-limiting example, packetizing the encoded content may include generating a transport stream (TS) according to one or more standards, such as the MPEG-2 standard. In other cases, other standards or formats may be utilized to packetize the content. As illustrated at 252, an aggregation process may be performed in which sets of packets may be grouped into disparate files 204. In various embodiments, such files may be sized to provide streaming-like performance when such content is provided to a client system over one or more networks. For instance, the files may be large enough to house multiple packets but small enough such that multiple Hypertext Transfer Protocol (HTTP) requests may be submitted by a client system in order to obtain the files in a streaming-like fashion. In the illustrated embodiment, only two files 204a-b are presented for clarity of illustration. However, it should be understood that in various embodiments the packetized content may be grouped into any number of files. In some embodiments, grouping the packetized content into different files 204 may be optional.

As illustrated at 254, a chained encryption process may be performed on files 204 to create multiple encrypted blocks 206 that represent the files. In some embodiments, encrypted blocks 206 may serve as a first protected version of the content. For example, encrypted blocks 206 may represent protected content 150a of FIG. 1 described above.

Figure 3:
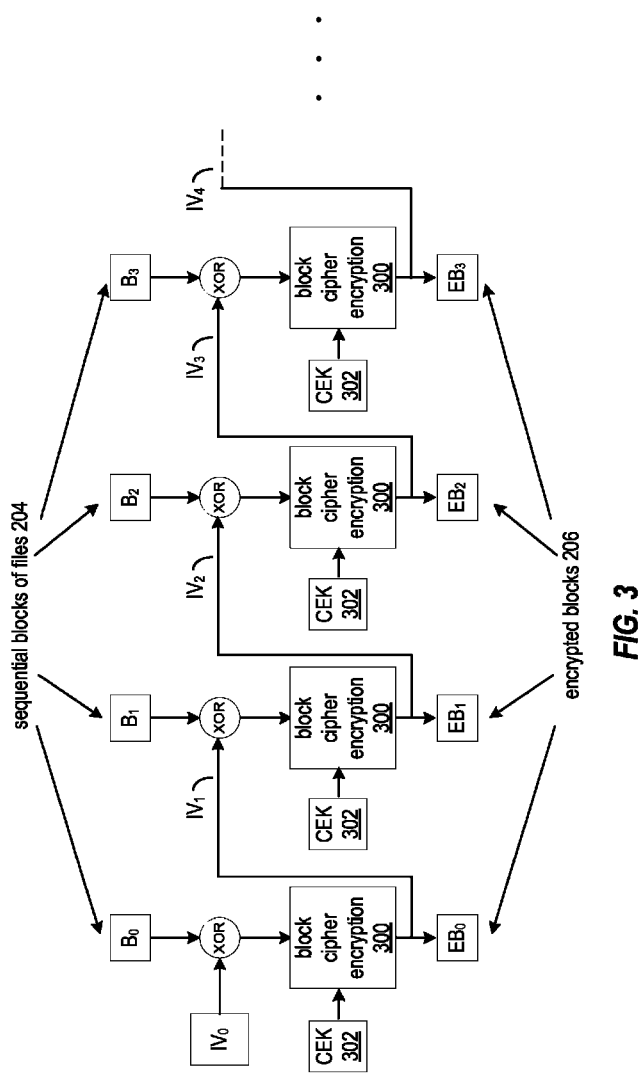
FIG. 3 illustrates one example of a chained encryption process performed on multiple blocks of content, according to some embodiments.

Referring collectively to FIGS. 2 and 3, the chained encryption of files 204 is described in further detail. FIG. 3 illustrates one example of chained encryption. As illustrated, files 204 may be parsed into a series of blocks. In various embodiments, these blocks may have a fixed width (e.g., 128 bits) dependent upon the type of encryption performed. In some embodiments, the encryption utilized may be Advanced Encryption Standard 128 bit Cipher-block chaining mode (AES-128 bit CBC mode) encryption. In other cases, other types of chained encryption may be utilized. In the illustrated embodiment, encryption may be generally performed in a sequential manner from the left to right of the Figure beginning with the first block $B_0$ and first initialization vector $IV_0$. In various embodiments, the first initialization vector $IV_0$ may be randomly or pseudo-randomly generated. However, as described in more detail below, initialization vectors for subsequent blocks may be generated such that the encryption of each subsequent block is dependent upon the previously encrypted block. In the illustrated embodiment, initialization vector $IV_0$ (which may be the same width as the block to be encrypted) and the first block to be encrypted $B_0$ may be processed by a bit-wise exclusive-or operation. In other cases, other logic operations may be utilized in place of the exclusive-or operation. The result of the exclusive-or operation may be encrypted with a content encryption key 302 using block cipher encryption 300. The result may be an encrypted block $EB_0$ having a size equal to that of the input block (e.g., 128 bits in this example).

In various embodiments, each subsequent block may be encrypted such that it is chained to the previous block. In other words, to encrypt (and thus also to decrypt) a given block, the encryption mechanism may be required to have knowledge of the previous encrypted block, according to some embodiments. The manner in which this aspect is implemented in various embodiments includes, for a given block, using the previous encrypted block as the initialization vector for the encryption of the given block. For instance, in the illustrated embodiment, the first encrypted block $EB_0$ may also be used as the second initialization vector $IV_1$. Similar to the encryption of the first block, an exclusive-or operation may be performed on $IV_1/EB_0$ and the second block $B_1$, the result of which may be encrypted by block cipher encryption 300 using content encryption key 302. The above described processes may be repeated as illustrated in order to encrypt all blocks of files 204. Returning to FIG. 2, these encrypted blocks are illustrated as encrypted blocks 206, which may represent encrypted versions of files 204a and 204b.

As illustrated at 256, content samples may be generated from encrypted blocks 206. In various embodiments, a content sample may correspond to a defined portion of content, such as an audio or video frame. However, in some embodiments, a sample may correspond to some other granularity of the content. As noted above, encrypted files 206 may be an encrypted version of files 204, which may include both content information (e.g., data representing the actual content, such as audio or video data) as well as non-content information, such as packet header (e.g., a transport header, such as that defined by the MPEG-2 standard or another standard defining a media transport stream) or file header information. However, in various embodiments, such non-content information may serve no meaningful role within the context of a sample-based file format that is not packetized or formatted according to the format of files 204. For various reasons (e.g., to avoid unnecessary overhead within the sample-based content 208), sample generation 256 may extract the encrypted blocks 206 that correspond to actual content information while disregarding non-content information. The extracted blocks may be assembled into a sample 208 as illustrated. While only one sample is presented for clarity of illustration, it should be understood that multiple samples may be generated in various embodiments. In various embodiments, this extraction process, by virtue of discarding some or all of the encrypted blocks 206 that correspond to non-content information, may break the encryption chain(s) described above. For instance, performing block-based decryption (described below with respect to FIG. 5) on the blocks of a sample that omits one or more of blocks 206 may result in an incorrect determination of initialization vectors (e.g., since initialization vectors may be dependent upon previous blocks) and thus an incorrect decryption result. However, in various embodiments, this situation may be avoided by storing the appropriate initialization vectors in the illustrated sample header 210 of one or more of the samples. For example, sample 208 is illustrated as including three different sets of encrypted blocks denoted as encryption chains 260, 262, and 264. In various embodiments, while the content of these encrypted blocks may represent a contiguous (or near contiguous) portion of content, there may exist encryption boundaries where the encryption is non-continuous (e.g., due to broken chains during the extraction of content blocks from encrypted blocks 206). Accordingly, for the first block of each encryption chain 260-264 in a given sample, the sample generation process may store the initialization vectors necessary to start the chained decryption of each chain within the sample header of that given sample. In this way, when a decryption process (e.g., on the client system) encounters an encryption boundary between the encryption chains, the encryption process may access the appropriate initialization vector from the sample header and decryption may resume.

In embodiments, the sample generation process may select the initialization vectors that are included in the sample header through the following techniques. When analyzing encrypted blocks 206, for each content block that is immediately preceded by a non-content block (e.g., a block containing non-content information, such as packet header or file header information), the sample generation process may store that non-content block as an initialization vector within the sample header of the sample being generated. As described in more detail below, the initialization vectors stored in the sample header may be utilized to decrypt different chains of encrypted blocks in the respective sample.

Figure 4:
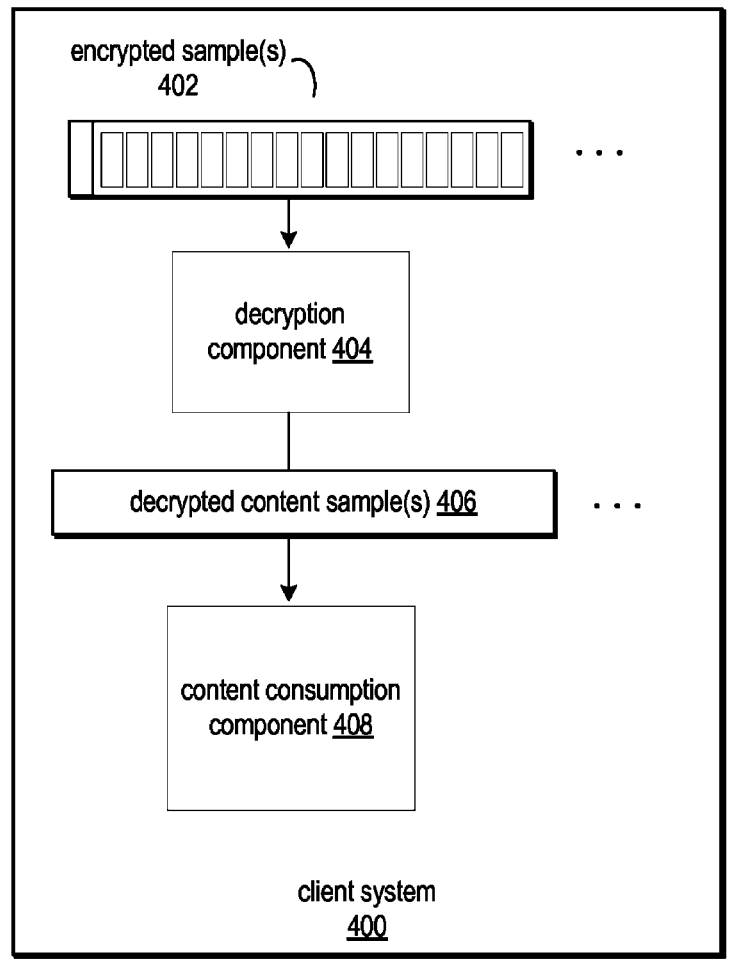
FIG. 4 illustrates a block diagram of an example client system, according to some embodiments.

FIG. 4 illustrates an example client system including decryption and consumption components, according to various embodiments. In the illustrated embodiment, client system 400 may be implemented by a computer system or other electronic devices, such as those described below with respect to the computer system of FIG. 13. In various embodiments, the client systems described above (e.g., client systems 155a-155b) may be configured in a manner similar to that of client system 400.

As illustrated, client system 400 may receive one or more encrypted samples 402, which may be configured in a manner similar to the samples described above. For example, client system 400 may receive multiple samples that represent audio and/or video frames, such as frames representing a media program (described above). For clarity of illustration, only one sample 402 is illustrated in FIG. 4. However, it should be understood that in various embodiments, the decryption and consumption techniques described below may be performed on multiple samples.

In various embodiments, decryption component 404 may be configured to perform block-based decryption on each encrypted sample. In various embodiments, to decrypt a given sample, decryption component 404 may be configured to perform the process illustrated in FIG. 5, which is described in more detail below. Generally, decryption component 404 may be configured to perform decryption on multiple blocks from a sample by using the initialization vectors from the sample header. The decrypted blocks are illustrated as decrypted content sample(s) 406, which may be consumed (e.g., played) by content consumption component 408. Content consumption component 408 may be configured to generate one or more representations of the content, such as by generating a graphical and/or audio representation of the content (e.g., on a display, speaker, and/or other device used for content consumption).

Figure 5:
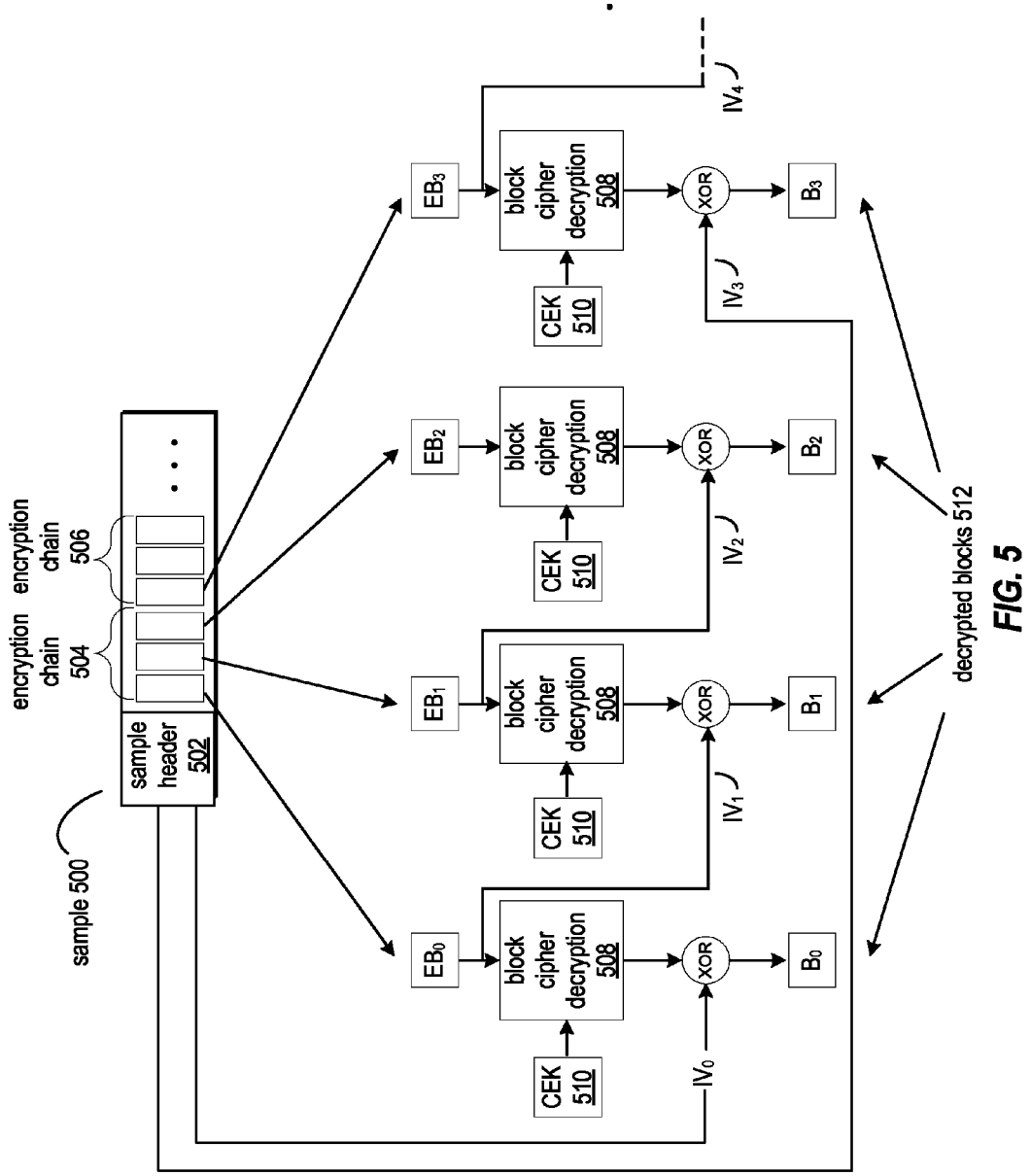
FIG. 5 illustrates one example of a chained decryption process performed on multiple blocks of content, according to some embodiments.

FIG. 5 illustrates a block diagram of the process for decrypting a given sample, according to various embodiments. The techniques of FIG. 5 may be implemented by the client systems described above. For instance, decryption component 404 may utilize the illustrated techniques to decrypt samples received on the client system. For clarity of illustration, only one sample 500 is illustrated in FIG. 5. However, it should be understood that in various embodiments, the decryption and consumption techniques described below may be performed on multiple samples. Similarly, while only two different encryption chains 504 and 506 are illustrated, any number of encryption chains may be present within a given sample in various embodiments. In the illustrated example, each encryption chain includes three blocks of encrypted content. However, in various embodiments, a given encryption chain may include any quantity of blocks, which may or may not be equal to the quantity of blocks in other encryption chains of the sample.

In the illustrated embodiment, the first encrypted block in the sample $EB_0$ may be extracted and decrypted with content encryption key 510. In various embodiments, the encrypted blocks may be symmetrically encrypted. Accordingly, content encryption key 510 may be the same as the key originally utilized to encrypt the content. In various embodiments, key 510 may be obtained through a license acquisition process, such as that described above with respect to FIG. 1. As illustrated, the first encrypted block $EB_0$ of the sample may be decrypted using the content encryption key 510. Furthermore, in accordance with chained decryption, the appropriate initialization vector $IV_0$ may be applied to the decryption result to determine the first decrypted block $B_0$ of decrypted blocks 512. In the illustrated embodiments, this is performed through an exclusive-or operation. The particular operation utilized will typically match the operation utilized to apply the initialization vector during the encryption process. As illustrated, the first initialization vector may be obtained from sample header 502. The decryption of the second and third blocks $EB_1$ and $EB_2$ to generate decrypted blocks $B_1$ and $B_2$ may be performed in a similar manner with the exception being that the initialization vectors $IV_1$ and $IV_2$ used to decrypt these blocks may be equivalent to the previous encrypted block, which is consistent with the techniques used to encrypt the blocks, such as described above with respect to FIG. 3. However, as illustrated, encrypted block $EB_3$ belongs to the second encrypted chain 506. Accordingly, block $EB_2$ cannot be utilized to as the initialization vector to decrypt block $EB_2$. In this case, the correct initialization vector IV3 may be extracted from sample header 502. (As described above with respect to sample generation 256, the initialization vectors need to start chained decryption of each chain may be stored in the sample header of each sample). In this way, the decryption process may be correctly performed across different encryption chains within the same sample.

In various embodiments, sample header 500 may include additional information to be used during decryption. For instance, for each set of blocks that represents a distinct encryption chain, sample header 500 may specify the size (e.g., in blocks or bits) and/or position of that set within the sample. Such information may be utilized by the client system for determining which initialization vectors apply to which blocks in the sample. In embodiments utilizing partial encryption, some sets of blocks may be unencrypted. For instance, in some embodiments, it may not be necessary for all sets of blocks to be encrypted. In one example, samples may be partially encrypted such that content consumption (e.g., playback) will be sufficiently disrupted for unauthorized clients (e.g., clients lacking the appropriate license and/or decryption keys), thus providing a deterrent to trying to consume the content without the proper license and/or decryption keys while also conserving computing resources and/or time. For instance this technique may conserve computing resources and/or time on the packaging side (because at least some sets of blocks are left unencrypted) and on the client side (e.g., because at least some sets of block do not need to be decrypted). As one example, consider an alternate configuration for sample 208 described above. If sample 208 were encrypted using partial encryption, at least some of the blocks may remain in the clear form whereas other blocks remain encrypted. For instance, instead of three encryption chains 260, 262, and 264, the sample may alternatively include encryption chain 260, encryption 264 and the remaining set of blocks could be left unencrypted (e.g., blocks corresponding to encryption chain 262 may be left unencrypted). In various embodiments, sample header 502 may also include information that identifies unencrypted blocks. For instance, sample header 205 may identify one or more blocks or a range of blocks that are not encrypted. Such information may be utilized by the client system for determining blocks that do not require decryption, thereby saving processing resources and/or time as described above. Any of the aforesaid information may be captured during the sample generation process 256 and stored as part of a given sample's header information.

Figure 6:
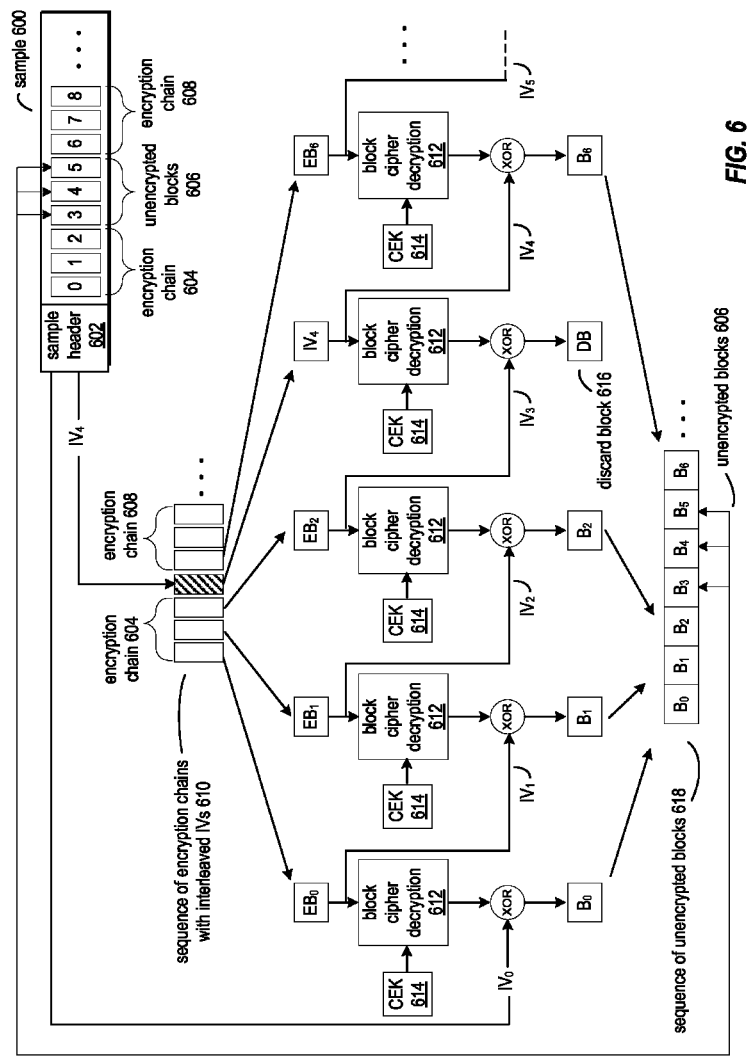
FIG. 6 illustrates an example of a chained decryption process performed on a sequence of encryption chains with interleaved initialization vectors, according to some embodiments.

Various implementations of the chained decryption described herein may include multiple phases, such as the initial set up of the initialization vector for decryption, the actual decryption of the encrypted block, and a finalization step to account for any padding as well as the purging of residual information. In various embodiments, some portions of chained decryption may be more costly from a performance perspective than other portions of chained decryption based on which block in an encryption chain is being decrypted. For instance, the setup actions of loading an initialization vector from a sample header into the block cipher and the corresponding block decryption may be more taxing from a time and/or processing (e.g., processing cycles) perspective relative to the decryption of a subsequent block in the encryption chain. For example, the decryption of block $EB_0$ may require more time and/or processing cycles relative to the decryption of block $EB_1$ as the decryption of $EB_0$ is the first block in encryption chain 504. Accordingly, various embodiments may utilize decryption techniques that reduce or minimize the time and/or processing impact of beginning the decryption of a new decryption chain. FIG. 6 illustrates a block diagram of an optimized process for decrypting a given sample, according to various embodiments. The techniques of FIG. 6 may be implemented by the client systems described above. For instance, decryption component 404 may utilize the illustrated techniques to decrypt samples received on the client system. For clarity of illustration, only one sample 600 is illustrated in FIG. 6. However, it should be understood that in various embodiments, the decryption and consumption techniques described below may be performed on multiple samples. Similarly, while only two different encryption chains 604 and 608 are illustrated, any number of encryption chains may be present within a given sample in various embodiments. In the illustrated example, each encryption chain includes three blocks of encrypted content. However, in various embodiments, a given encryption chain may include any quantity of blocks, which may or may not be equal to the quantity of blocks in other encryption chains of the sample.

As illustrated at 610, the decryption component may generate a sequence of encryption chains with interleaved initialization vectors. For instance, sequence 610 includes encryption chain 604, followed by the initialization vector ($IV_4$) for the next encryption chain 608. As illustrated, this initialization vector is actually inserted inline with the data and, as described below, will be decrypted in the same (or similar) manner as the blocks of the encryption chains. As described in more detail below, due to the nature of chained decryption, this may enable the decryption component to avoid the overhead (e.g., time and/or processing cycles) associated with the set up aspect of chained decryption for one or more subsequent decryption chains.

In various embodiments, the first block of the sequence, $EB_0$, may be loaded into block cipher 612 and decrypted with content encryption key 614 and a first initialization vector $IV_0$ retrieved from sample header 602 of sample 600. The result of this decryption process may be decrypted block $B_0$. Next, encrypted block $EB_1$ from sequence 610 is decrypted using CEK 614 and an initialization vector $IV_1$ that is equivalent with the previous encrypted block $EB_0$ to generate decrypted block $B_1$. Encrypted block $EB_2$ is decrypted in a similar manner. Also illustrated, the initialization vector $IV_4$ for the second encryption chain 608 is also decrypted as if it were an encrypted block of a decryption chain. For instance, $IV_4$ is retrieved from sequence 610 and decrypted with CEK 614 and an initialization vector $IV_3$ that is equal to the previous encrypted block $EB_2$. The initialization vector $IV_4$ will decrypt to "garbage" in the sense that it does not represent any actual content (e.g., audio or video) where as the decrypted blocks of the encryption chains will be partially or entirely comprised of content. Accordingly, the decrypted initialization vector is illustrated as a discard block 616 in the illustrated embodiment. The decryption component may discard or exclude this block from the sequence of unencrypted blocks 628 that are consumed by a playback component, such as content consumption component 408 of FIG. 4.

While decrypting $IV_4$ to generate a discard block that is discarded may incur some overhead (e.g., time and/or processing cycles), this aspect of the decryption also provides performance enhancements that outweigh the costs of decrypting $IV_4$. For instance, because $IV_4$ is actually decrypted during chained decryption, the decryption component is relieved of performing the set up process for decrypting the subsequent encryption chain 606. Instead, the current instance of chained decryption may proceed with the decryption of block $EB_6$ with CEK 614 and $IV_4$, which is equivalent to the previous encrypted block (in this case, also $IV_4$). As illustrated, instead of the set up process of retrieving the initialization vector of the second encryption chain (i.e., $IV_4$) is streamlined due to its position as the previous encrypted block. By enabling the encryption component to continue the chained decryption in this manner, as opposed to performing a new set up process to decrypt the second encryption chain (similar to the process illustrated in FIG. 5), embodiments may improve the performance of the decryption component (e.g., via reduced time and/or processing cycles for decryption). By creating the sequence of encryption chains with interleaved IVs 610 and using the techniques described above, the decryption component may simply decrypt the entire sequence 610 as if it were one contiguous encryption chain even though the sequence comprises multiple, different encryption chains from the sample.

As described above, in some embodiments, samples may be partially encrypted such that content consumption (e.g., playback) will be sufficiently disrupted for unauthorized clients (e.g., clients lacking the appropriate license and/or decryption keys), thus providing a deterrent to trying to consume the content without the proper license and/or decryption keys while also conserving computing resources and/or time. For instance this technique may conserve computing resources and/or time on the packaging side (because at least some sets of blocks are left unencrypted) and on the client side (e.g., because at least some sets of block do not need to be decrypted). In accordance with these techniques, one or more unencrypted blocks of content 606 may also be included within a given sample. As these blocks are already in an unencrypted state, the decryption component may avoid performing chained decryption on these blocks. Instead, the decryption component may insert these blocks into the appropriate position within the sequence of unencrypted blocks 628. This sequence may then be consumed (e.g., played) by the content consumption component of the client (e.g. content consumption component 408).

Figure 7:
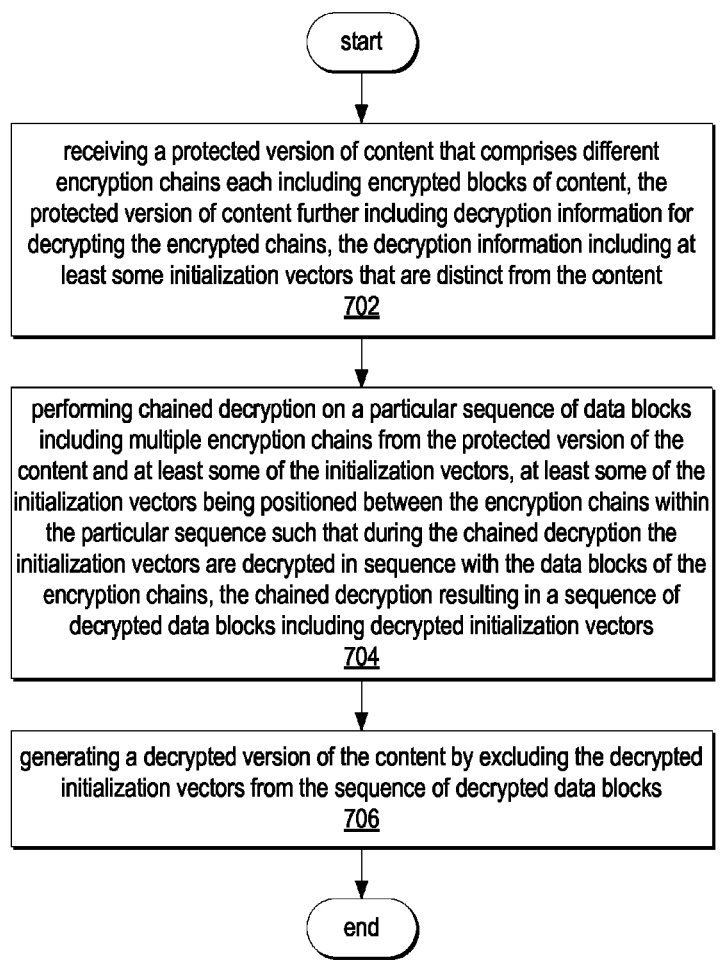
FIG. 7 illustrates a flowchart of an example method for performing chained decryption process on a sequence of encryption chains with interleaved initialization vectors, according to some embodiments.

FIG. 7 illustrates an example method for performing chained decryption on a sequence of encryption chains with interleaved initialization vectors. In various embodiments, the illustrated method may be performed by a decryption component, such as decryption component 404 of client system 400. In various embodiments, the illustrated method may be performed by one or more computers, such as computer 1300 of FIG. 13. As illustrated at block 702, the method may include receiving a protected version of content that comprises different encryption chains each including encrypted blocks of content. The protected version of content may also include decryption information for decrypting the encrypted chains, which may include at least some initialization vectors that are distinct from the content. For instance, one example of the protected version of content may include one or more samples, such as the samples described above including but not limited to sample 600. An example of the decryption information may include any of the sample headers described above, including but not limited to sample header 602. As described above, these sample headers may store an initialization vector for each encryption chain within the sample.

As illustrated at block 704, the method may also include performing chained decryption on a particular sequence of data blocks including multiple encryption chains from the protected version of the content and at least some of the initialization vectors. Within this sequence, at least some of the initialization vectors may be positioned between the encryption chains such that during the chained decryption the initialization vectors are decrypted in sequence with the data blocks of the encryption chains; the chained decryption may result in a sequence of decrypted data blocks including decrypted initialization vectors. One example of decrypting such a sequence is described above with respect to the creation and decryption of the sequence of encryption chains with interleaved IVs 610.

As illustrated at block 706, the method may further include generating a decrypted version of the content by excluding the decrypted initialization vectors from the sequence of decrypted data blocks. One example of excluding decrypted initialization vectors from a sequence of decrypted data blocks includes the exclusion of block 616 from sequence 618 described above.

In various embodiments, the content may include one or more unencrypted data blocks representing content. In these cases, the method may include finalizing the generation of the decrypted version of the content by inserting the unencrypted data blocks into the sequence of decrypted data blocks. One example of this insertion is illustrated in FIG. 6 by the insertion of unencrypted blocks B3, B4, and B5 into the sequence of unencrypted blocks 618.

Figure 8:
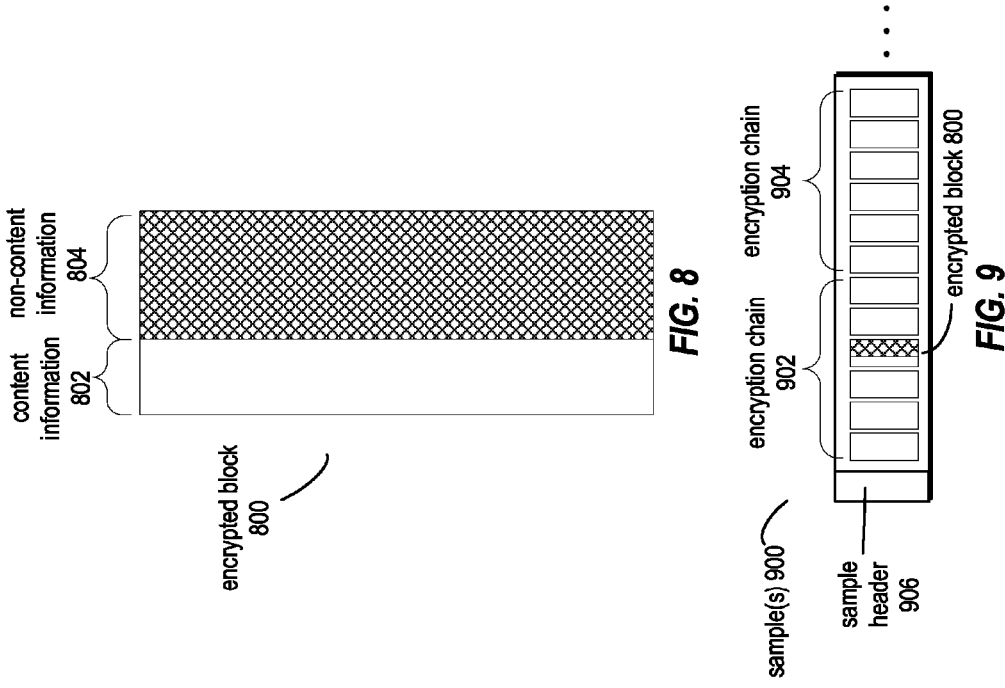
FIG. 8 illustrates a block diagram of an example partial media block including both content information and non-content information, according to some embodiments.

In some embodiments, some encrypted blocks of the samples may include both content information (e.g., information representing video and/or audio) and non-content information. In some cases, this may occur due to manner in which the process illustrated in FIG. 2 is performed. For instance, while blocks that wholly comprise non-content information may be removed during sample generation 256, there may be one or more blocks that include both content information and non-content information as the boundaries between content and non-content information and the boundaries between blocks may not always coincide when the data is divided up into blocks. In one example, the non-content information may include header information packet header or file header information from packetized content 202 or files 204*a*-*b* illustrated in FIG. 2. One example of an encrypted block that includes both content information and non-content information is illustrated in FIG. 8. As illustrated, encrypted block 800 may include content information 802 (e.g., information representing audio and/or video) as well as non-content information 804 (e.g., packet header or file header information). In various instances, blocks that include both content information and non-content information may be referred to as partial media blocks (whether encrypted or unencrypted). As described in more detail below, instead of breaking an encryption chain when encountering a partial media block, the encryption process of various embodiments may instead encrypt the partial media block as part of an encryption chain of multiple blocks. Additionally, the encryption process may embed discard information within the content (e.g., as part of header information); the discard information may specify the location (e.g., a bit or byte range of a specific block) of non-content information to be removed after decryption. As described in more detail below, this discard information may be used on the client side to discard the non-content information. In various embodiments, discard information may be utilized for full blocks as well, such as when an initialization vector is inserted into the content without being indicated as a separate initialization vector in the header information.

Figure 9:
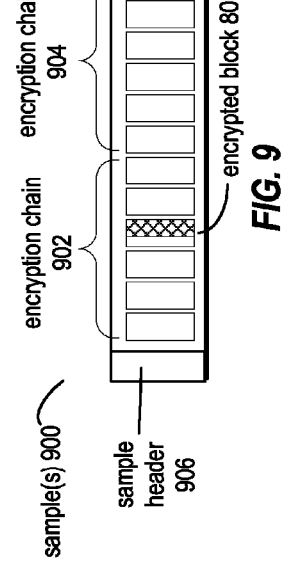
FIG. 9 illustrates a block diagram of an example media sample including a partial media block, according to some embodiments.

One example of content encrypted in this manner is illustrated in FIG. 9. As illustrated a sample 900 may be generated including multiple encryption chains 902 and 904 according to techniques similar to those described above (e.g., as in FIG. 2). However, in this case, one of the encryption chains (chain 902) includes a encrypted partial media block illustrated as encrypted block 800. Furthermore, in addition to the header information described above, sample header 906 may also include discard information that specifies the location of the non-content information of encrypted block 800. As described in more detail below, this discard information may be used on the client side to discard the non-content information.

Figure 10:
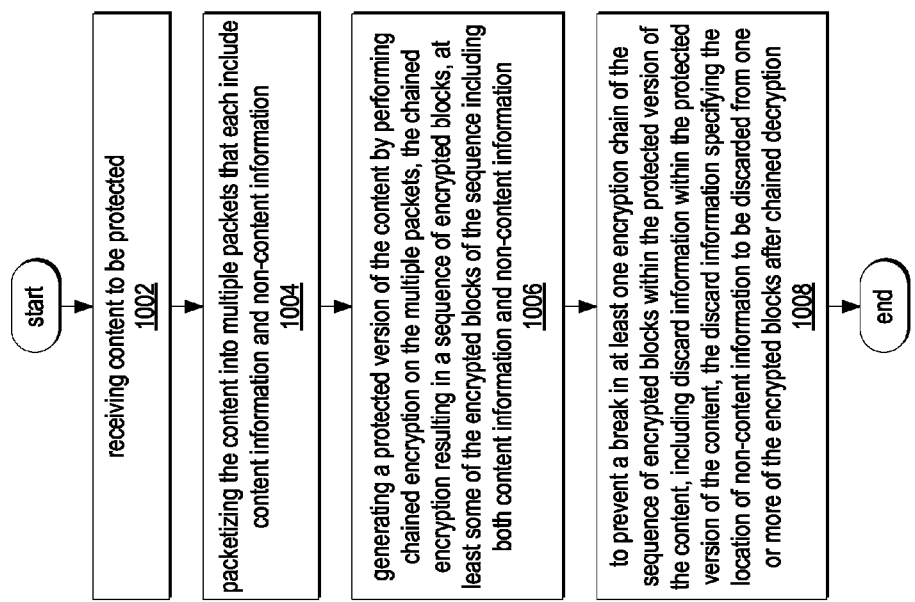
FIG. 10 illustrates a flowchart of an example method for creating encrypted content including discard information specifying the location of non-content information to be discarded after decryption of the content, according to some embodiments.

FIG. 10 illustrates an example method for performing chained encryption on encrypted content that includes partial media blocks as part of encryption chains. In various embodiments, the illustrated method may be performed by a packager component or assembler component, such as the packager component or assembler component of FIG. 1. In various embodiments, the illustrated method may be performed by one or more computers, such as computer 1300 of FIG. 13.

As illustrated at block 1002, the method may include receiving content to be protected. For instance, one example of receiving content to be protected may include the receipt of encoded content item 115 of FIG. 1. As illustrated at block 1004, the method may include packetizing the content into multiple packets that each include content information and non-content information. For instance, packetizing may include parsing the encoded content into packets, each of which may include packet header information and a packet payload that includes content. In one non-limiting example, packetizing the encoded content may include generating a transport stream (TS) according to one or more standards, such as the MPEG-2 standard. In other cases, other standards or formats may be utilized to packetize the content.

As illustrated at block 1006, the method may include generating a protected version of the content by performing chained encryption on the multiple packets, the chained encryption resulting in a sequence of encrypted blocks, at least some of the encrypted blocks of the sequence including both content information and non-content information. In various embodiments, this portion of the method may include performing any of the above-described encryption techniques on a sequence of blocks that includes at least some partial media blocks. These encryption techniques may include but are not limited to the chained encryption of FIG. 3. For instance, the encryption techniques of FIG. 3 may be applied to a sequence of blocks that include at least some partial media blocks.

As illustrated at block 1008, the method may include, to prevent a break in at least one encryption chain of the sequence of encrypted blocks within the protected version of the content, including discard information within the protected version of the content, the discard information specifying the location of non-content information to be discarded from one or more of the encrypted blocks after chained decryption. For instance, the illustrated method may include one or more samples similar to sample 900; discard information may be included within the sample header to specify which portions of one or more blocks may be discarded after decryption. By encrypting the partial media blocks and including discard information for removing the non-content information after decryption on the client side, embodiments may enable the encryption process to avoid breaking an encryption chain due to the presence of non-content information.

Figure 11:
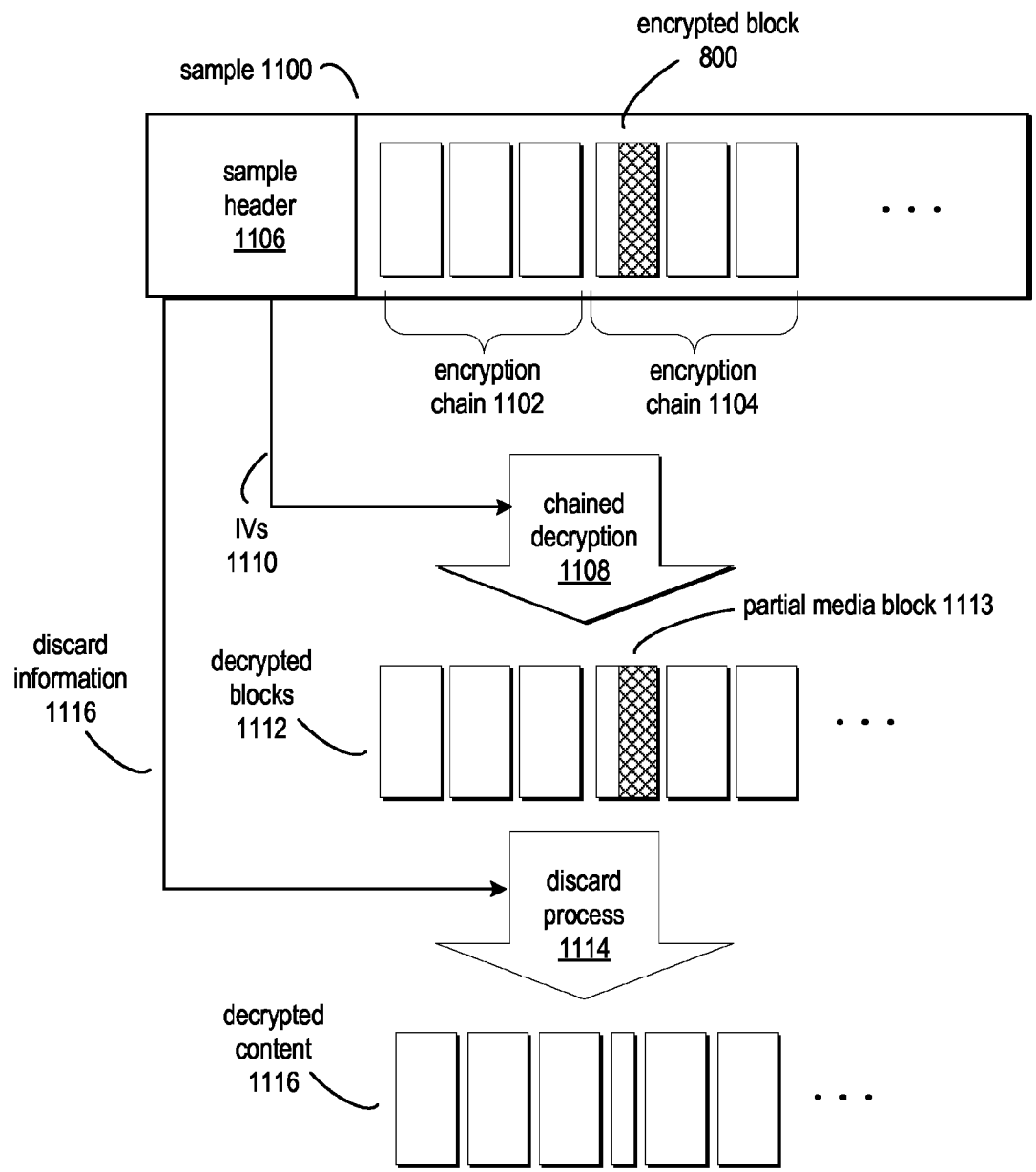
FIG. 11 illustrates an example flow diagram for a discard process that discards non-content information from decrypted content in accordance with discard information of the content, according to some embodiments.

FIG. 11 illustrates a flow diagram of the decryption of content including partial media blocks on the client side. As illustrated, a sample 1100 may include multiple encryption chains 1102-1104 (and others, not illustrated). At least some of the blocks forming the encryption chains may be partial media blocks that include content information and non-content information. For instance, encryption chain 1104 includes encrypted block 800 in the illustrated example. Additionally, sample header 1106 may also include discard information that specifies the location of the non content information. For instance, the discard information may specify a bit or byte range of encrypted block 800 that should be discarded after decryption. The sample header may also include any of the header information described above, such as initialization vectors for each of the encryption chains.

As illustrated, chained decryption 1108 may be performed on the encryption chains of the sample to generate decrypted blocks 1112. This process may include sourcing one or more IVs 1110 from the sample header to decrypt the encryption chains using any of the chained decryption techniques described above (e.g., as described with respect to FIGS. 5 and 6). As illustrated, decrypted blocks 1112 may include a decrypted version of encrypted block 800, illustrated as partial media block 1113. Partial media block 1113 may include both content and non-content information. To discard the non-content information, a discard process 1114 may be performed. During discard process 1114, discard information 1116 may be retrieved from sample header 1106. This information may be utilized to locate and remove the non content information of one or more blocks of decrypted blocks 1112. Discard process 1114 may result in decrypted content 1116, which may be similar to decrypted blocks 1112 with the exception that the non-content information of partial media block 1113 has been removed.

In various embodiments, the discard techniques described herein need not be limited to discarding a partial block. Indeed, in some cases, these discard techniques may be utilized to discard portions of data equal to or greater than an entire block. For example, depending on the media formats or encryption schemes utilized to generate the encrypted blocks (e.g., FIG. 2), multiple blocks of content may be discarded. For instance, some blocks pertaining to the file based format 204 may not be needed for the sample based format 208. In another example, in some cases, an initialization vector can be inserted in the bit stream post-encryption and marked as information that is to be discarded post-decryption. In this case, the initialization vector may be up to a full block.

Figure 12:
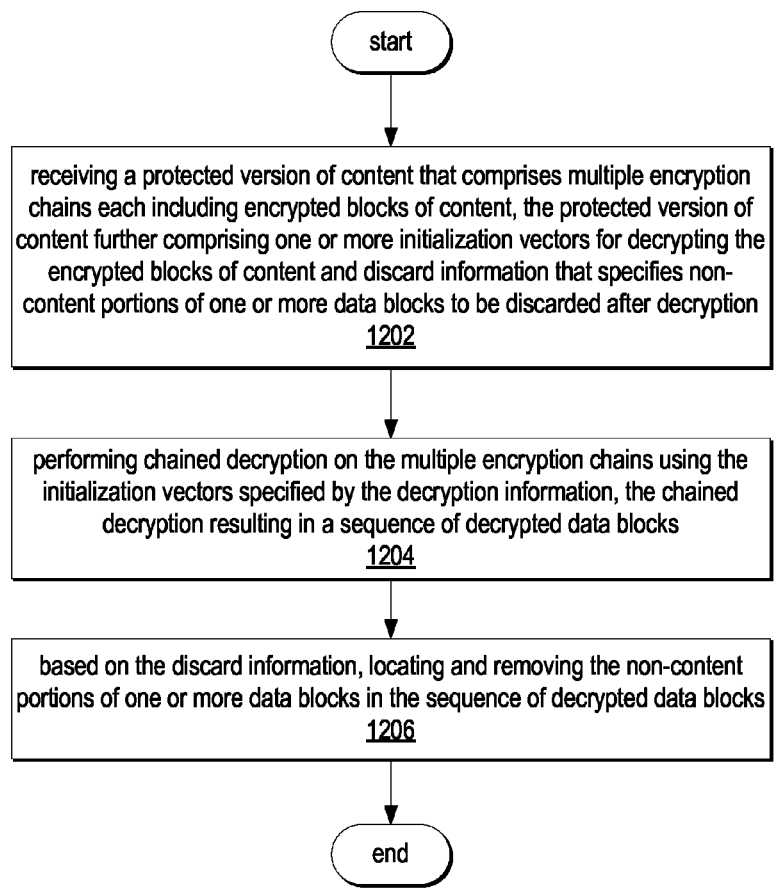
FIG. 12 illustrates a flowchart of an example method for discarding non-content information from decrypted content in accordance with discard information of the content, according to some embodiments.

FIG. 12 illustrates an example method for performing chained decryption on content that includes partial media blocks as part of encryption chains. In various embodiments, the illustrated method may be performed by a decryption component, such as decryption component 404 of FIG. 4. In various embodiments, the illustrated method may be performed by one or more computers, such as computer 1300 of FIG. 13.

As illustrated at block 1202, the method may include receiving a protected version of content that comprises multiple encryption chains each including encrypted blocks of content. The protected version of content may include one or more initialization vectors for decrypting the encrypted blocks of content and discard information that specifies non-content portions of one or more data blocks to be discarded after decryption. Once example of the protected version of content includes one or more samples, such as sample 1100 of FIG. 1. In this example, the header information may contain the decryption information (e.g., discard information, initialization vectors).

As illustrated at block 1204, the method may include performing chained decryption on the multiple encryption chains using the initialization vectors specified by the decryption information; the chained decryption may result in a sequence of decrypted data blocks. For instance, the chained encryption may result in performing any of the chained decryption techniques described herein, such as those of FIGS. 5 and 6.

As illustrated at block 1206, the method may include, based on the discard information, locate and remove the non-content portions of one or more data blocks in the sequence of decrypted data blocks. One example of this removal process is described above with respect to discard process 1114. For instance, this portion of the method may include retrieving discard information from a sample header; the discard information may specify a bit or byte range (within one or more data blocks) that includes non-content information to be removed. For instance, using encrypted block 800 described above as an example, the discard information may be used to locate and remove the decrypted version of non-content information 804. In this way, the non-content information will not interfere with the playback of the actual content at content consumption time.

While the discard techniques described herein are largely described within the context of chained decryption (e.g., AES-128 bit CBC mode), these techniques may also be applied to other block-based encryption/decryption schemes. For instance, the techniques described herein may also be applied to other modes of encryption/decryption, including but not limited to a counter mode (e.g., AES-128 bit CTR mode). Instead of chaining blocks together according to chained encryption/decryption techniques, counter modes of encryption/decryption may utilize a nonce similar to the initialization vectors described herein combined (e.g., XOR, concatenation, addition) with a counter value in order to encrypt/decrypt blocks. The discard techniques described herein apply to counter modes of encryption/decryption as well as other types of block-based cryptography, whether presently known or developed in the future.

Secure Communication

In various embodiments, various elements of the illustrated framework may be associated with respective public key-private key pairs, such as key pairs utilized in Public Key Infrastructure (PKI). In the illustrated framework, a first element may securely transfer data to a second element by encrypting that data with the second element's public key. In this manner, only the second element will be able to decrypt the encrypted data to access the unencrypted data, according to various embodiments. For instance, since in various embodiments knowledge of the private key may be required to decrypt the data and since the second element may be the only element that has knowledge of its own private key, the second element may be the only element able to decrypt the data with the correct private key. Note that the aforesaid techniques may in various embodiments be utilized for any transfer of data within the system of FIG. 1. One non-limiting example includes the "binding" of a content license to client system at license acquisition time. For example, the license server might obtain a public key for the client system and encrypt a content license with that public key prior to transferring the license to the playback device. In this example, only the client system will be able to decrypt the license (since the playback device may be the only element with knowledge of the correct private key). In some embodiments, a given element may trust another element with knowledge of its private key (thereby allowing the other element to decrypt data encrypted with the given element's public key). In various embodiments, the public keys described herein may be obtained from a public key certificate, such as a certificate provided by a certificate authority (not illustrated) in PKIs. One example of such a certificate is an X.509 certificate (in other cases, other types of public key certificates may be utilized).

Example Computer System

Various embodiments of a system and method for decryption of content including partial-block discard, as described herein, may be executed on one or more computer systems, which may interact with various other devices. One such computer system is computer system 1300 illustrated by FIG. 13, which may in various embodiments implement any of the systems, devices, elements or methods illustrated in FIGS. 1-12. For instance, any of the functionality described above may be stored in memory as processor-executable executable program instructions 1322 (e.g., program instructions executable by processor(s) 1310). In one non-limiting example, instructions 1322 may implement one or more decryption components 404 or content consumption components 408, as illustrated. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such systems, or multiple nodes making up computer system 1300, may be configured to host different portions or instances of various embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x96, PowerPC, SPARC, or MIPS ISAs, or any other suitable ISA. In multiprocessor systems, each of processors 1310 may commonly, but not necessarily, implement the same ISA.

System memory 1320 may be configured to store program instructions 1322 and/or data 1332 accessible by processor 1310. In various embodiments, program instructions 1322 may be executable by the processor(s) to implement the functionality of any packaging component, assembler component, encryption component, decryption component, or client system described above. As illustrated, in various embodiments, data 1332 may store one or more encrypted content items such as encrypted samples 402, from which decrypted content, such as decrypted samples 406, may be generated or assembled. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 1320. In other embodiments, program instructions and/or data may be received, sent or stored upon different types of computer-accessible media or on similar media separate from system memory 1320 or computer system 1300.

In one embodiment, I/O interface 1330 may be configured to coordinate I/O traffic between processor 1310, system memory 1320, and any peripheral devices in the computer system, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network (e.g., network 1385), such as other computer systems (e.g., any element of FIG. 1), or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

In some embodiments, the illustrated computer system may implement any of the processes or methods described above, such as those of FIGS. 2-3, 5-7, and 10-12. In other embodiments, different elements and data may be included.

Those skilled in the art will appreciate that computer system 1300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method implemented by one or more computers, the method comprising:
   packetizing encoded content into packets, each of which includes packet header information and a packet payload that includes a respective portion of the encoded content;
   aggregating sets of the packets into disparate files, each of the files including a respective file header;
   sizing the files large enough to include multiple ones of the packets, yet small enough that the sized files are obtainable as streamed data over one or more networks;
   performing a chained encryption process using the sized files to create a plurality of encrypted blocks;
   extracting the encrypted blocks that correspond to the encoded content and disregarding one or more of the encrypted blocks that correspond to non-content information including one or more of the packet headers and one or more of the file headers; and
   generating samples from a plurality of the extracted encrypted blocks, each said sample having a sample header, at least one sample header including an initialization vector that corresponds to at least one of the disregarded encrypted blocks, the initialization vector usable in a decryption process in place of the at least one disregarded encrypted blocks.

2. A method as described in claim 1, wherein the packets are configured according to one or more standards involving a transport stream.

3. A method as described in claim 2, wherein the one or more standards include an MPEG-2 standard.

4. A method as described in claim 2, wherein the performing of the chained encryption process includes parsing the files into a series of blocks.

5. A method as described in claim 4, wherein each of the blocks has a fixed width.

6. A method as described in claim 5, wherein the width is dependent on a type of the encryption to be performed.

7. A method as described in claim 2, wherein the generated samples correspond to a defined portion of the encoded content.

8. A method as described in claim 7, wherein the defined portion is a frame.

9. A method as described in claim 2, wherein the performing of the chained encryption process includes including discard information in a sequence of the encrypted blocks that includes information specifying a location of non-content information to be discard from the one or more encrypted blocks after the chained decryption.

10. A method as described in claim 9, wherein the extracting is performed based on the discard information.

11. A method implemented by one or more computers, the method comprising:
receiving protected content, the protected content including a plurality of samples generated from a plurality of encrypted blocks, the plurality of encrypted blocks extracted such that one or more encrypted blocks that correspond to non-content information including one or more of the packet headers and one or more of the file headers are not included in the samples, the extraction performed based on discard information included in a sequence of the encrypted blocks that includes information specifying a location of the non-content information; and
performing chained decryption on the plurality of samples of the received protected content using initialization vectors specified in the protected content that includes one or more unencrypted blocks representing content and the performing of the chained decryption is not performed on the one or more unencrypted blocks.

12. A method as described in claim 11, further comprising inserting the one or more unencrypted blocks into a sequence of decrypted blocks.

13. A method as described in claim 11, wherein the content is audio or video.

14. A method as described in claim 11, wherein the generated correspond to a defined portion of encoded content.

15. A method as described in claim 14, wherein the defined portion is a frame.

16. A system comprising:
one or more processors; and
a memory coupled to the one or more processors and including instructions that are executable by the one or more processor to perform operations comprising:
performing a chained encryption process using aggregated sets of packets to create a plurality of encrypted blocks, the aggregated sets of the packets formed into disparate files, each of the files including a respective file header and sized large enough to include multiple ones of the packets, yet small enough that the sized files are obtainable as streamed data over one or more networks, the packets formed from encoded content, each of the packets including header information and a packet payload that includes a respective portion of the encoded content;
extracting the encrypted blocks that correspond to the encoded content and disregarding one or more of the encrypted blocks that correspond to non-content information including one or more of the packet headers and one or more of the file headers; and
generating a protected version of the content that includes samples from a plurality of the extracted encrypted blocks, each said sample having a sample header, at least one sample header including an initialization vector that corresponds to at least one of the disregarded encrypted blocks, the initialization vector usable in a decryption process in place of the at least one disregarded encrypted blocks.

17. A system as described in claim 16, wherein the packets are configured according to one or more standards involving a transport stream.

18. A system as described in claim 16, wherein the performing of the chained encryption process includes parsing the files into a series of blocks.

19. A system as described in claim 16, wherein the samples correspond to a defined portion of the encoded content.

20. A system as described in claim 19, wherein the defined portion is a frame.

21. A system as described in claim 16, wherein the performing of the chained encryption process includes including discard information in a sequence of the encrypted blocks that includes information specifying a location of non-content information to be discard from the one or more encrypted blocks after the chained decryption.

22. A system as described in claim 21, wherein the extracting is performed based on the discard information.

23. A computer-readable storage memory comprising instructions stored thereon that, responsive to execution by one or more computers, causes the one or more computers to perform operations comprising:
performing a chained encryption process using aggregated sets of packets to create a plurality of encrypted blocks, the aggregated sets of the packets formed into disparate files, each of the files including a respective file header and sized large enough to include multiple ones of the packets, yet small enough that the sized files are obtainable as streamed data over one or more networks, the packets formed from encoded content, each of the packets including header information and a packet payload that includes a respective portion of the encoded content;
extracting the encrypted blocks that correspond to the encoded content and disregarding one or more of the encrypted blocks that correspond to non-content information including one or more of the packet headers and one or more of the file headers; and
generating a protected version of the content that includes samples from a plurality of the extracted encrypted blocks, each said sample having a sample header, at least one sample header including an initialization vector that corresponds to at least one of the disregarded encrypted blocks, the initialization vector usable in a decryption process in place of the at least one disregarded encrypted blocks.

24. The computer-readable storage memory as described in claim 23, wherein the performing of the chained encryption process includes including discard information in a sequence of the encrypted blocks that includes information specifying a location of non-content information to be discard from the one or more encrypted blocks after the chained decryption and wherein the extracting is performed based on the discard information.

* * * * *